(12) United States Patent
Sharma et al.

(10) Patent No.: US 11,153,512 B1
(45) Date of Patent: *Oct. 19, 2021

(54) IMAGING AND DISPLAY WITH ELLIPSOIDAL LENSING STRUCTURE

(71) Applicant: Facebook Technologies, LLC, Menlo Park, CA (US)

(72) Inventors: Robin Sharma, Redmond, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/425,308

(22) Filed: May 29, 2019

(51) Int. Cl.
| | |
|---|---|
| *H04N 5/33* | (2006.01) |
| *G06K 9/00* | (2006.01) |
| *G02B 27/01* | (2006.01) |
| *G06F 3/01* | (2006.01) |

(52) U.S. Cl.
CPC .......... *H04N 5/33* (2013.01); *G02B 27/0172* (2013.01); *G06F 3/013* (2013.01); *G06K 9/0061* (2013.01); *G06K 9/00604* (2013.01)

(58) Field of Classification Search
None
See application file for complete search history.

(56) References Cited

U.S. PATENT DOCUMENTS

| | | | | |
|---|---|---|---|---|
| 5,621,424 A * | 4/1997 | Shimada | .............. | G02B 27/017 345/8 |
| 5,661,603 A * | 8/1997 | Hanano | .............. | G02B 27/0081 359/622 |
| 5,815,741 A * | 9/1998 | Okuyama | ........ | H04N 5/225251 396/51 |
| 6,449,309 B1 * | 9/2002 | Tabata | ................. | H04B 13/398 375/240.01 |
| 2002/0030636 A1 * | 3/2002 | Richards | .............. | G02B 27/017 345/8 |
| 2003/0103169 A1 * | 6/2003 | Okada | ................ | G02B 27/0172 348/790 |
| 2004/0080467 A1 * | 4/2004 | Chinthammit | .......... | G06F 3/011 345/7 |
| 2008/0291397 A1 * | 11/2008 | Tesar | ....................... | A61B 3/12 351/221 |
| 2009/0051879 A1 * | 2/2009 | Vitale | .................... | G03B 21/28 353/28 |
| 2009/0079937 A1 * | 3/2009 | Chen | ..................... | A61B 3/145 351/210 |
| 2010/0045933 A1 * | 2/2010 | Eberl | ................. | G02B 27/0172 351/210 |

(Continued)

OTHER PUBLICATIONS

Khayatzadeh, Scanning Fiber Microdisplay: design, implementation, and comparison, Optics Express, Mar. 5, 2018, vol. 26, No. 5.

(Continued)

*Primary Examiner* — Peter D Le
(74) *Attorney, Agent, or Firm* — Freestone IP Law PLLC; Aaron J. Visbeek; William J. Pigott

(57) ABSTRACT

An eye is illuminated with light propagating substantially normal to a pupil plane of the eye. Illuminating the eye includes illuminating an ellipsoidal combiner that has a foci at a center of rotation of the eye. The light propagates through the pupil to become incident on the retina.

19 Claims, 13 Drawing Sheets

(56) References Cited

U.S. PATENT DOCUMENTS

| | | | |
|---|---|---|---|
| 2011/0075257 A1* | 3/2011 | Hua | H04N 13/383 359/464 |
| 2012/0257166 A1* | 10/2012 | Francis | G02B 21/0028 351/208 |
| 2013/0314793 A1* | 11/2013 | Robbins | G02B 27/0172 359/573 |
| 2016/0091720 A1* | 3/2016 | Stafford | G02B 27/0068 345/8 |
| 2016/0187653 A1* | 6/2016 | Kimura | G06T 11/60 345/8 |
| 2017/0371163 A1* | 12/2017 | Ries | G02B 27/0172 |
| 2019/0179409 A1* | 6/2019 | Jones | G02B 27/0093 |
| 2019/0222830 A1 | 7/2019 | Edwin et al. | |
| 2019/0258062 A1 | 8/2019 | Aleem et al. | |
| 2020/0183155 A1 | 6/2020 | Xie et al. | |

OTHER PUBLICATIONS

Non-Final Office Action, U.S. Appl. No. 16/425,344, dated Dec. 8, 2020, 8 pages.

* cited by examiner

IMAGING AND DISPLAY WITH ELLIPSOIDAL LENSING STRUCTURE

TECHNICAL FIELD

This disclosure relates generally to optics, and in particular to retinal imaging and display with an ellipsoidal lensing structure.

BACKGROUND INFORMATION

Optical combiners are utilized in a variety of contexts including for use in head mounted displays (HMD). Typically, optical combiners allow a user to view incident scene light from an external environment while also providing optical structures that allow for imaging of the eye or to present images to the eye. In the context of eye-tracking, it is desirable to know where the eye or eyes are gazing.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
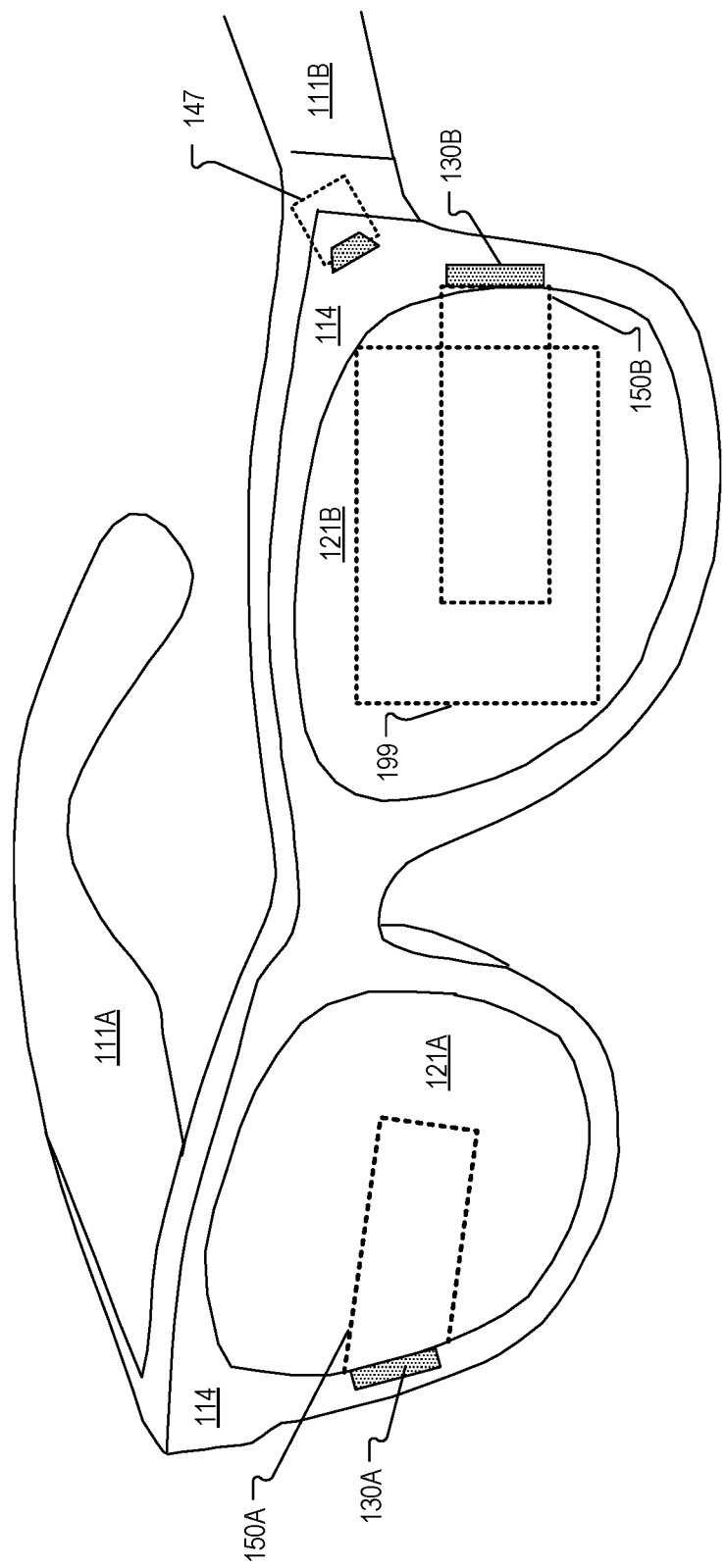
FIG. 1 illustrates an example HMD that may include a combiner for directing light to and from an eye of a user of HMD, in accordance with an embodiment of the disclosure.

Embodiments for imaging the retina and displaying images with an ellipsoidal lensing structure are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The apparatus, system, and method for imaging a retina that are described in this disclosure include illuminating an ellipsoidal lensing structure with infrared illumination light. The ellipsoidal lensing structure directs the infrared illumination light to the eye so that the infrared illumination light is propagating substantially normal to a pupil plane of the eye. A portion of the infrared illumination light is reflected by the retina, propagates back through the pupil, and is reflected by the ellipsoidal lensing structure to a light sensor. In other words, the infrared illumination light directed to the retina by the ellipsoidal lensing structure may also be "descanned" by the ellipsoidal lensing structure to the light sensor for purposes of generating a retinal image. In some embodiments, illuminating the eye with the infrared illumination light includes scanning a beam-steering element to a plurality of two-dimensional scan positions and generating the retinal image includes capturing a plurality of light measurements from the light sensor while the beam-steering element is in a corresponding scan position. In this case, the light sensor may be a photodiode or a photomultiplier tube.

The ellipsoidal lensing structure may be included in a combiner optical element included in a head mounted display (HMD). The combiner optical element may direct infrared illumination light to the eye while passing display light and/or external scene light from an ambient environment to the eye. The ellipsoidal lensing structure has a first foci and a second foci and the combiner is configured to be positioned near an eye where the first foci of the ellipsoidal structure is located approximately at a center of rotation of the eye. Consequently, even when the eye gazes in different directions (up, down, right, left), the center of the rotation of the eye remains at the first foci of the ellipsoidal lensing structure. Therefore, for different eye positions, the infrared illumination light may be directed (using a scanner) to a position on the ellipsoidal lensing structure that will redirect the infrared illumination light so it propagates substantially normal to a pupil plane of the eye to eventually illuminate the retina to generate the retinal image.

In another embodiment of the disclosure, visible display light is raster scanned to two-dimensional coordinates on the ellipsoidal lensing structure to present images to the eye. A scanner may direct the display light to different areas of the ellipsoidal lensing structure based on eye-tracking data having eye-position data so that the display light is directed to portions of the ellipsoidal lensing structure that will direct the display light through the pupil to be incident on the retina. These and other embodiments are described in connection with FIGS. 1-9 below.

FIG. 1 illustrates an example HMD 100 that may include a combiner 199 for directing light to and from an eye of a user of HMD 100, in accordance with an embodiment of the disclosure. Combiner 199 may include an ellipsoidal lensing structure, as will be discussed in more detail below. HMD 100 includes frame 114 coupled to arms 111A and 111B. Lenses 121A and 121B are mounted to frame 114. Lenses 121 may be prescription lenses matched to a particular wearer of HMD or non-prescription lenses. The illustrated HMD 100 is configured to be worn on or about a head of a user of the HMD.

In FIG. 1, each lens 121 includes a waveguide 150 to direct display light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing display light to a wearer of HMD 100.

The frame 114 and arms 111 of the HMD 100 may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving display light directed to her eye(s) by waveguide(s) 150. Consequently, lenses 121 may be considered (or include) an optical combiner. In some embodiments, display light is only directed into one eye of the wearer of HMD 100. In an embodiment, both displays 130A and 130B are included to direct display light into waveguides 150A and 150B, respectively.

Eye-tracking module 147 may gather eye-tracking data of an eye of the user to determine an eye-position of the eye of the user. In one embodiment, eye-tracking module 147 includes a camera configured to capture infrared images of the eye. The camera may be configured to only capture images of infrared light corresponding to an infrared wavelength of infrared emitters (not illustrated) of HMD 100 that illuminate the eye of the user. Eye-tracking module 147 may be mounted on the inside of the temple of HMD 100. Although eye-tracking module 147 and combiner 199 are illustrated on only one side of HMD 100, they of course may be duplicated on the other side of HMD 100.

Figure 2A:
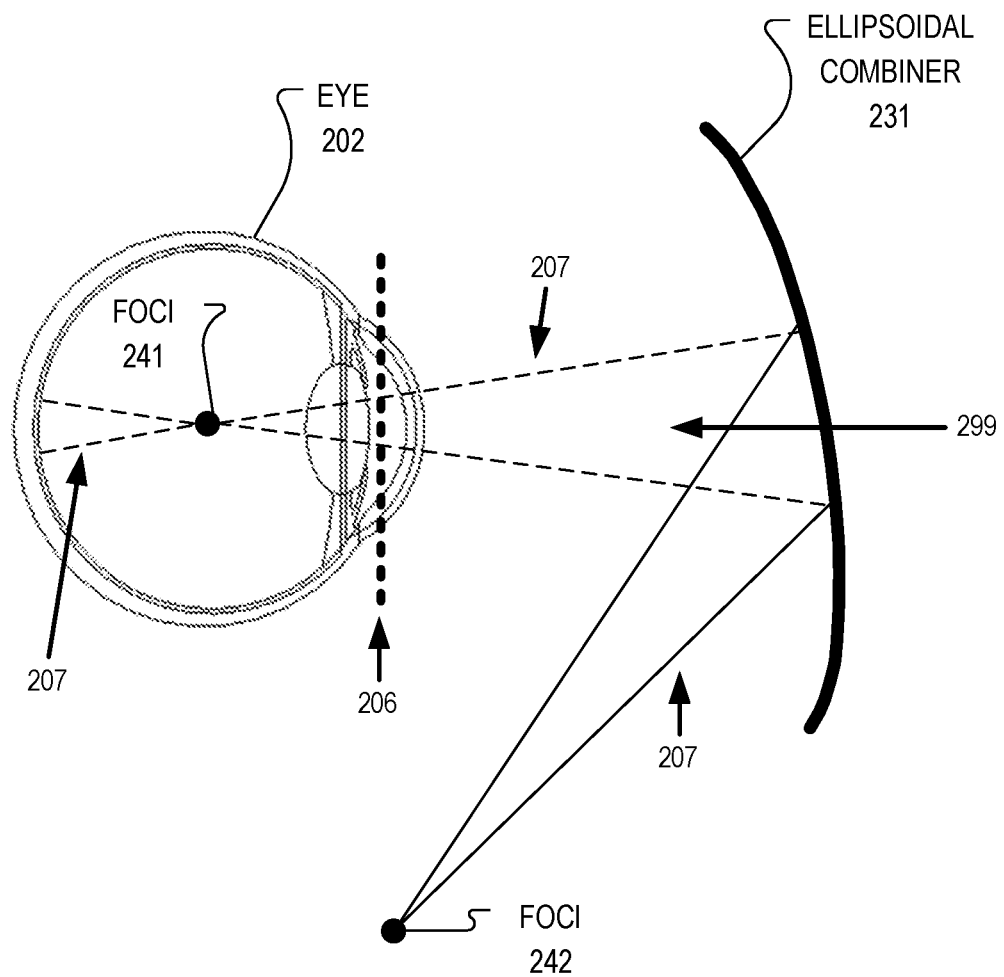
FIGS. 2A-2C illustrate an eye in different positions with respect to an ellipsoidal combiner having an ellipsoidal curvature, in accordance with an embodiment.

FIG. 2A illustrates an ellipsoidal combiner 231 having an ellipsoidal curvature, in accordance with an embodiment of the disclosure. The ellipsoidal curvature of ellipsoidal combiner 231 may follow a three-dimensional curvature defined by a mathematical ellipsoidal equation. In a Cartesian coordinate system, an ellipsoid may be described by:

$$\frac{x^2}{a^2} + \frac{y^2}{b^2} + \frac{z^2}{c^2} = 1 \qquad \text{(Equation 1)}$$

where a, b, and c are positive real numbers. Ellipsoidal combiner 231 includes a portion of a full ellipsoid surface. Ellipsoidal combiner 231 may include an infrared reflecting layer disposed on ellipsoidal curvature so that infrared light encountering the infrared reflecting layer is reflected by the ellipsoidal combiner while visible light is passed. In the context of an HMD, this allows display light or scene light 299 from the external environment to pass through the infrared reflecting layer (aka "hot mirror") so that the user of the HMD can view images of the external environment. The ellipsoidal combiner 231 is positioned to have a first foci 241 that is at a center of rotation of an eye 202 that is placed in an eyebox location relative to the ellipsoidal combiner 231. Consequently, light 207 illuminating the ellipsoidal curvature from a second foci 242 of the ellipsoidal combiner 231 will be focused to foci 241 at the center of rotation of eye 202. FIG. 2A illustrates that light 207 propagates through the cornea, anterior chamber, pupil, and lens before becoming incident upon the retina. At least a portion of the illustrated light 207 propagates substantially normal to a two-dimensional pupil plane 206 defined by the pupil of the eye 202.

Figure 2B:
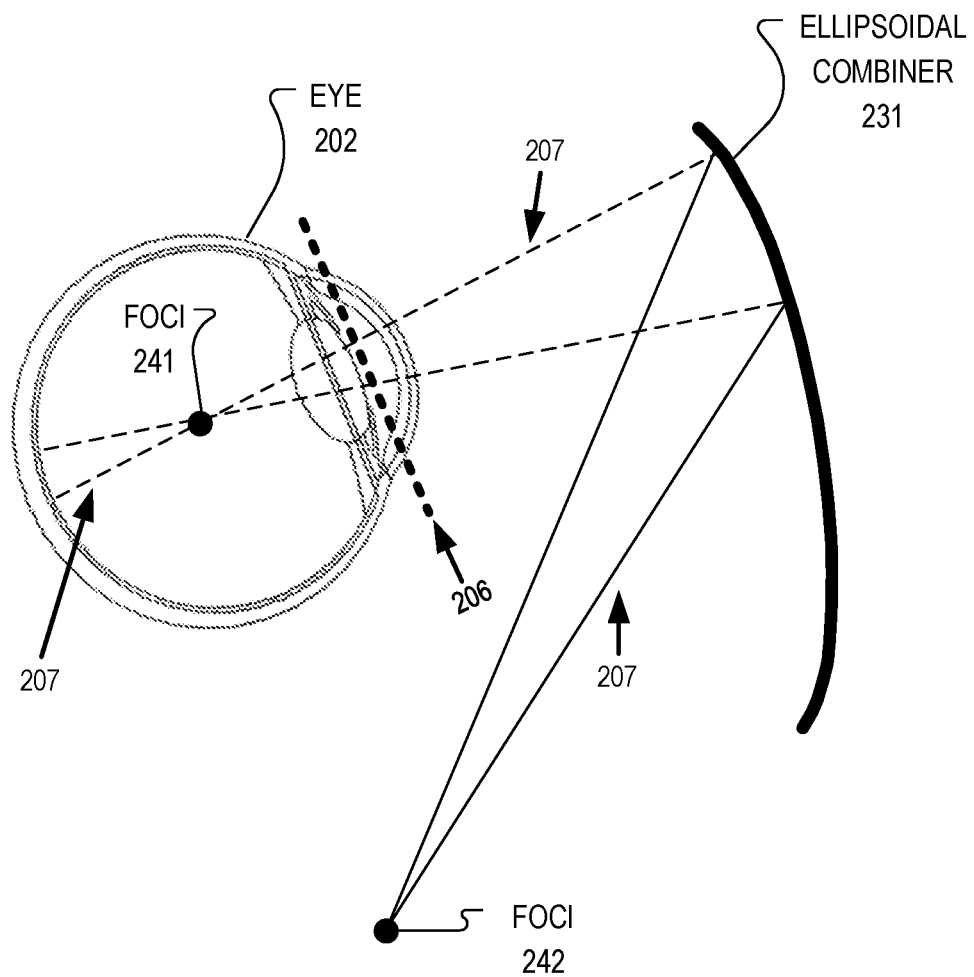

FIG. 2B illustrates ellipsoidal combiner 231 focusing light 207 emitted by second foci 242 to the first foci 241 at the center of rotation of eye 202 when eye 202 has changed a gaze angle of the eye, in accordance with an embodiment of the disclosure. Therefore, a light source positioned at second foci 242 may illuminate a different portion of ellipsoidal combiner 231 when eye 202 rotates and still focus the light 207 to the center of rotation of the eye 202 at the first foci 241 of ellipsoidal combiner 231. The eye 202 illustrated in FIG. 2B may be gazing up or gazing to the left, for example.

Figure 2C:
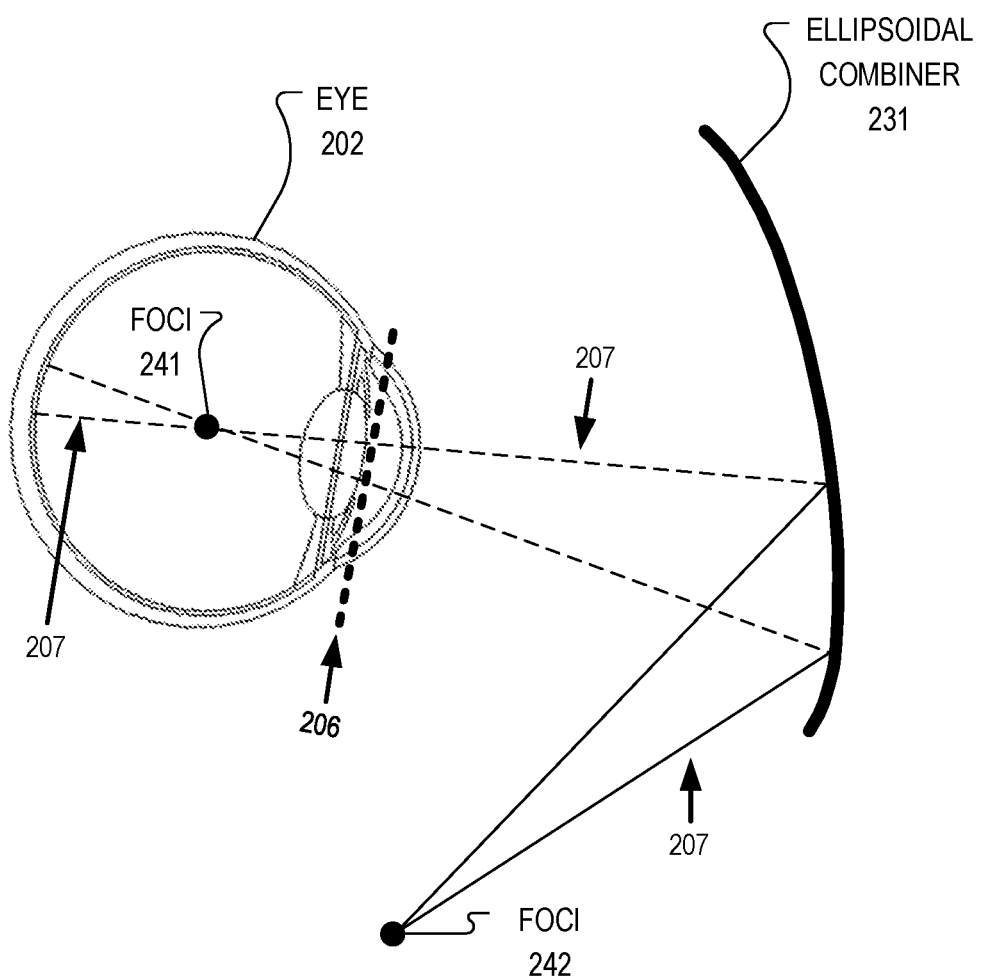

FIG. 2C illustrates ellipsoidal combiner 231 focusing light 207 emitted by second foci 242 to the first foci 241 at the center of rotation of eye 202 when eye 202 is at yet another gaze angle, in accordance with an embodiment of the disclosure. Here again, a light source positioned at second foci 242 may illuminate a portion of ellipsoidal combiner 231 when eye 202 rotates to another gaze angle and still focus the light 207 to the center of rotation of the eye 202 at the first foci 241 of ellipsoidal combiner 231. The eye 202 illustrated in FIG. 2C may be gazing down or gazing to the right, for example. In embodiments of the disclosure, light 207 from second foci 242 may be directed to a particular location of ellipsoidal combiner 231 and redirected by combiner 231 through the pupil to first foci 241 for a range of gaze angles up to 80 degrees horizontal and 80 degrees vertical.

Figure 3A:
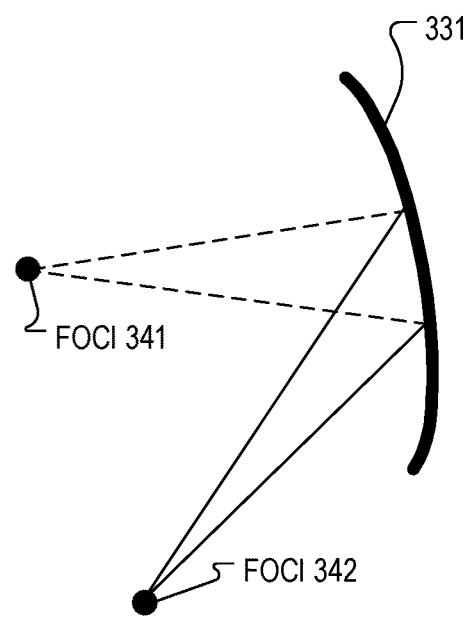
FIG. 3A-3C illustrate example ellipsoidal lensing structures that may be included in an ellipsoidal combiner, in accordance with an embodiment of the disclosure.
Figure 3B:
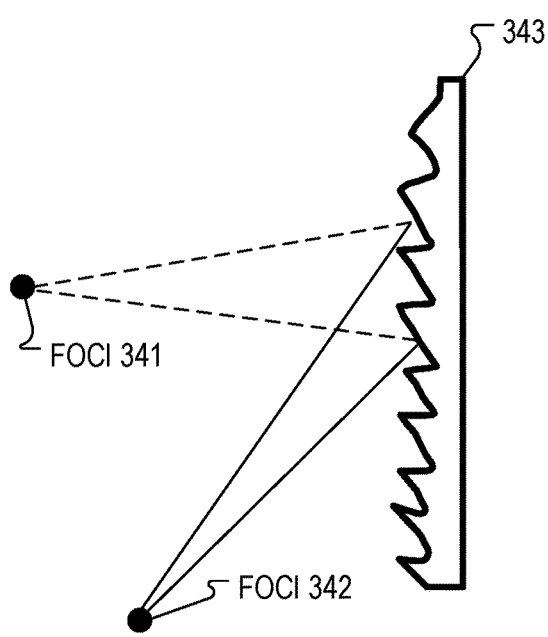
Figure 3C:
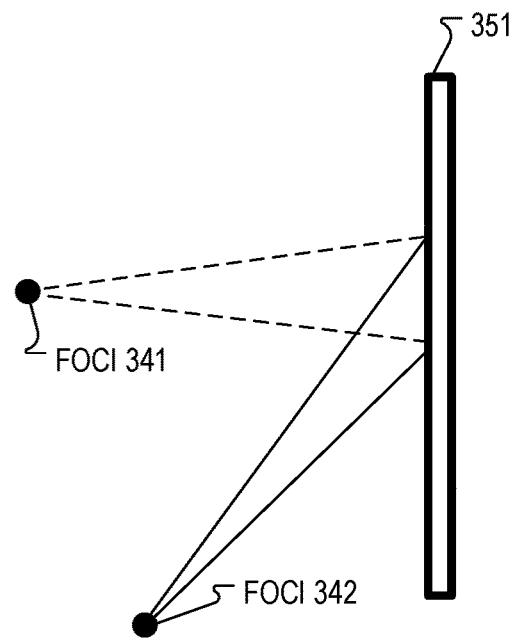

FIGS. 3A-3C illustrate example ellipsoidal lensing structures that may be included in an ellipsoidal combiner such as ellipsoidal combiner 231, in accordance with an embodiment of the disclosure. FIG. 3A illustrates an ellipsoidal lensing structure having a reflecting layer disposed on an ellipsoidal curvature 331. The reflecting layer may be partially reflective (e.g. a beam splitter layer) or be selectively reflective to a particular wavelength or polarization orientation of light to focus light received from second foci 342 to first foci 341. In one embodiment, the reflecting layer is configured to reflect a narrow wavelength band of infrared light centered around 850 nm. In one embodiment, the reflecting layer is configured to pass a first polarization orientation (e.g. s-polarized light) while reflecting a second polarization orientation (e.g. p-polarized light). Including a partially reflective or selectively reflective reflecting layer may allow a combiner to reflect light having particular attributes and pass display light or scene light 299 to the eye of a user.

FIG. 3B illustrates an ellipsoidal Fresnel structure 341 as an example ellipsoidal lensing structure, in accordance with an embodiment of the disclosure. Ellipsoidal Fresnel structure 343 may be an ellipsoidal optical surface decomposed into its Fresnel form having Fresnel facets disposed along a common plane. Hence, ellipsoidal Fresnel structure 343 may function as an ellipsoidal curvature that reflects and focuses light received from second foci 342 to first foci 341, similar to ellipsoidal curvature 331. The partially reflective or selectively reflective layer described in connection with FIG. 3A may be disposed on the Fresnel structure 343.

FIG. 3C illustrates a diffractive ellipsoidal structure 351 as an example ellipsoidal lensing structure, in accordance with an embodiment of the disclosure. Diffractive ellipsoidal structure 351 may include a reflective volume Bragg grating or a holographically recorded ellipsoidal surface that focuses light received from second foci 342 to first foci 341 and is functionally similar to ellipsoidal curvature 331. Since the embodiments illustrated in FIGS. 3B and 3C may be fabricated in a plane, these embodiments may decrease the form factor of the ellipsoidal lensing structure that is selected for a combiner to be included into a lens of a head mounted display.

Figure 4A:
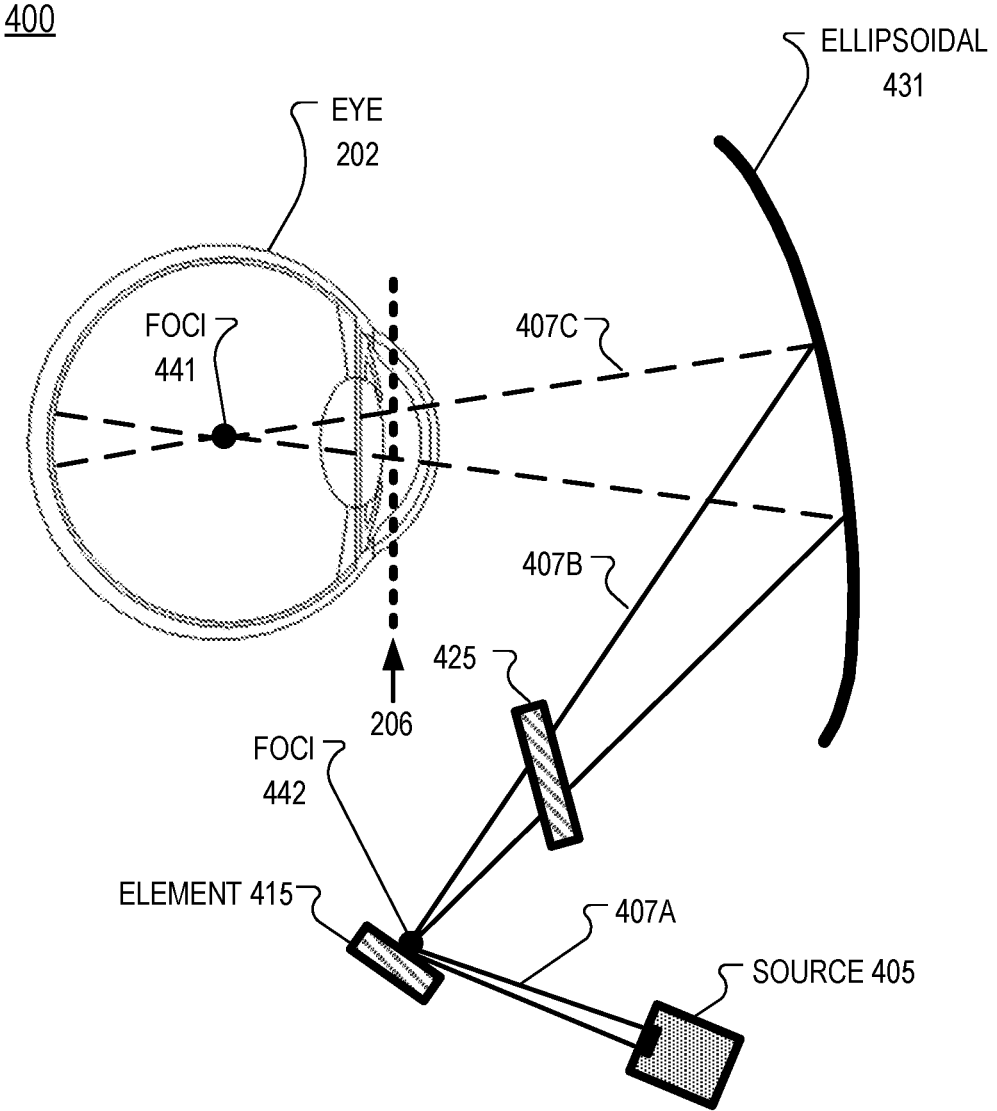
FIG. 4A-4C illustrate a retinal imaging system including an ellipsoidal lensing structure, in accordance with an embodiment of the disclosure.
Figure 4B:
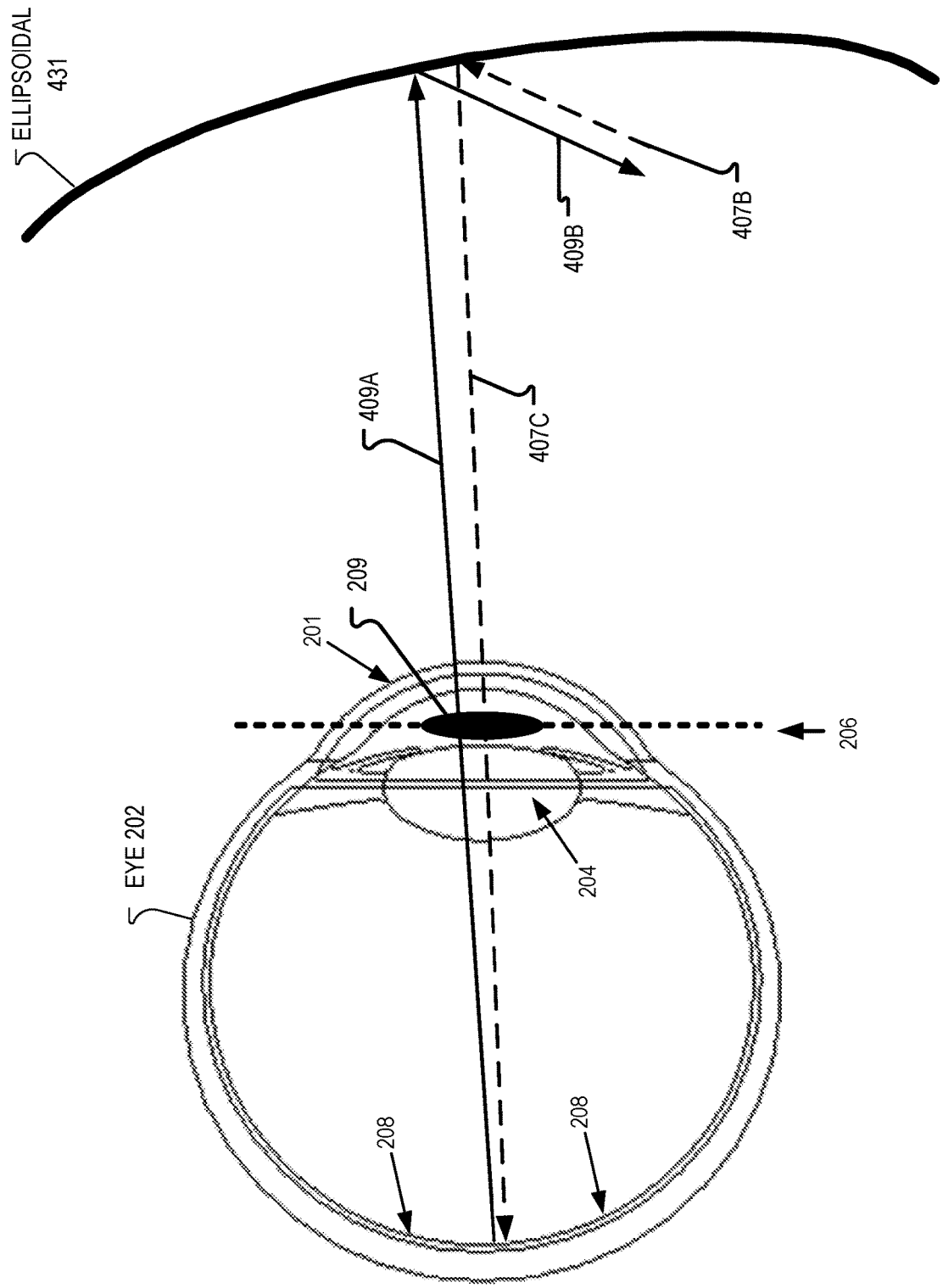
Figure 4C:
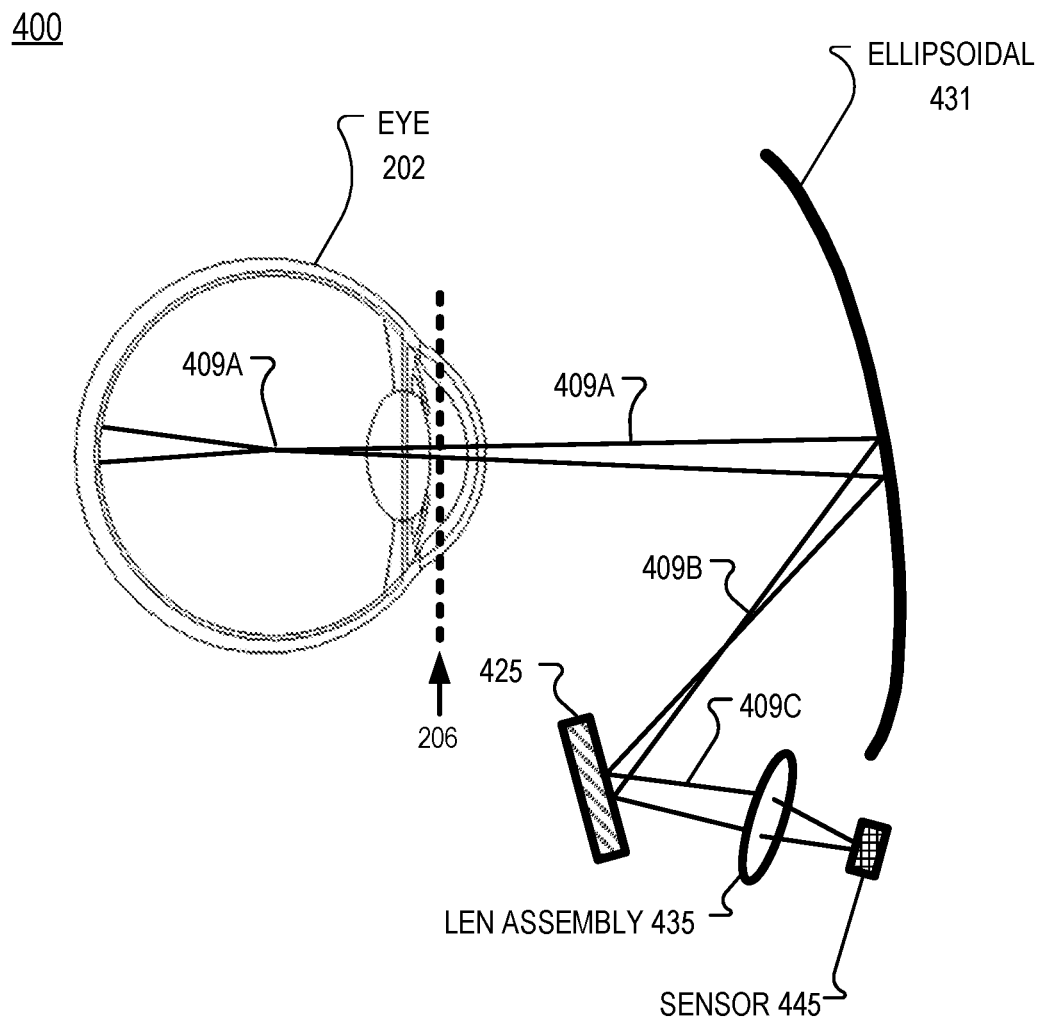

FIGS. 4A-4C illustrate a retinal imaging system 400 including an ellipsoidal lensing structure, in accordance with an embodiment of the disclosure. FIG. 4A illustrates an illumination portion of system 400. In FIG. 4A, an infrared light source 405 emits infrared illumination light 407A. Infrared light source 405 may include an LED or a laser diode. Infrared illumination light 407A may be collimated light. Beam-steering element 415 is configured to selectively redirect the infrared illumination light 407A to ellipsoidal combiner 431 as infrared illumination light 407B. Ellipsoidal combiner 431 may include any of the ellipsoidal lensing structures 331, 343, or 351. The infrared illumination light 407B that is directed to ellipsoidal combiner 431 may encounter a beam splitter element 425 before encountering ellipsoidal combiner 431. Beam splitter element 425 may pass a portion (e.g. 50%) of infrared illumination light 407B to ellipsoidal combiner 431 while reflecting the remaining portion (e.g. 50%). Ellipsoidal combiner 431 is configured to redirect infrared illumination light 407B to eye 202.

Ellipsoidal combiner 431 is to be positioned such that the first foci 441 of the ellipsoidal combiner 431 is at a center of rotation of eye 202. Beam-steering element 415 may be located at a second foci 442 of ellipsoidal combiner 431. Beam-steering element 415 may be a digital micromirror device (DMD) that adjusts a position of a mirror to direct infrared illumination light 407A to different locations of the ellipsoidal combiner 431. For example, the beam-steering element 415 may be driven to direct infrared illumination light 407B to different positions on ellipsoidal combiner 431 in response to eye-tracking data that includes a position of eye 202. In some embodiments, the DMD includes a curved mirror that acts as a collimator of received infrared illumination light 407A so that infrared illumination light 407B directed toward ellipsoidal combiner 431 is collimated or near-collimated. In another embodiment, a scanning fiber module is used to steer a fiber that carries the infrared illumination light 407A emitted by an infrared light source included in the scanning fiber module. The scanning fiber module may include a one or more piezo-electric actuators that are coupled to move the fiber. The fiber of the scanning fiber module may be moved at a high rate to illuminate different locations of the ellipsoidal combiner 431. The infrared illumination light 407B emitted by the fiber scanning module may be collimated or near-collimated.

The ellipsoidal combiner 431 redirects infrared illumination light 407B as infrared illumination light 407C. FIG. 4B illustrates a zoomed in view of eye 202 and ellipsoidal combiner 431, in accordance with an embodiment of the disclosure. Portions of infrared illumination light 407C (not illustrated) may not necessarily propagate through the pupil and may be scattered by the iris or cornea. However, at least a portion of infrared illumination light 407C propagates substantially normal to pupil plane 206 of eye 202 and propagates through the cornea 201, anterior chamber, pupil 209, and lens 204 of eye 202 before becoming incident upon the retina 208. A portion (e.g. ~10% for 850 nm light) of infrared illumination light 407C reflects off the retina 208 as reflected infrared light 409A. In FIG. 4B, reflected infrared light 409A propagates through lens 204, pupil 209, and cornea 201 to exit eye 202. Reflected infrared light 409A then encounters ellipsoidal combiner 431 and ellipsoidal combiner 431 redirects the reflected infrared light 409A as reflected infrared light 409B.

FIG. 4C illustrates an imaging portion of system 400 configured to capture a retinal image of eye 202 using reflected infrared light 409A. Ellipsoidal combiner 431 directs reflected infrared light 409A to light sensor 445 via beam splitter 425, in the illustrated embodiment. Light sensor 445 is configured to receive the reflected infrared light 409C that is reflected by element 425. The illustrated embodiment includes a lens assembly 435 to focus the reflected infrared light 409C to light sensor 445. Light sensor 445 may include a photodiode or a photomultiplier tube. In some embodiments, system 400 may include processing logic (not illustrated) that is configured to select a scanning position of beam-steering element 415 and also configured to initiate a light capture of light sensor 445 that corresponds to the selected scanning position of beam-steering element 415. In this way, a pixel-by-pixel retina image can be scanned out when the illumination portion of system 400 illuminates a particular portion of retina 208 by illuminating a specific location of ellipsoidal combiner 431 and a measurement of the reflected infrared light 409 that is reflected by the retina 208 is measured by the light sensor 445.

Because the pupil of eye 202 acts as a field stop for both infrared illumination light 407C and reflected infrared light 409A, only the infrared illumination light 407C that propagates substantially normal to pupil plane 206 will propagate through the pupil, reflect of the retina, and exit the pupil (also propagating substantially normal to pupil plane 206) to then be redirected to light sensor 445 by ellipsoidal combiner 431. Some portions of infrared illumination light 407C that propagates through the pupil (but does not propagate substantially normal to pupil plane 206) will reflect off of retina 208 but the angle of reflection will not allow the reflected infrared light to exit the pupil 209, but instead be absorbed by other tissue within the eye.

Figure 5:
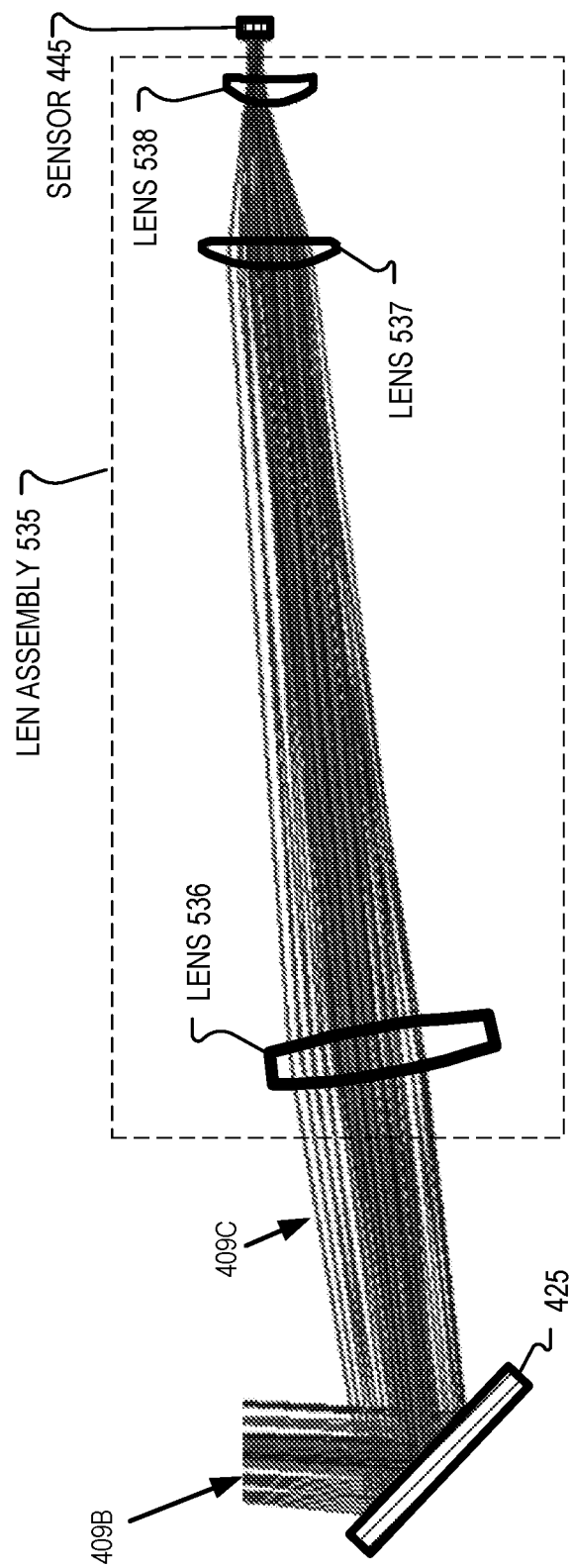
FIG. 5 illustrates an example lens assembly, in accordance with an embodiment of the disclosure.

FIG. 5 illustrates an example lens assembly 535 that may be used as lens assembly 435, in accordance with an embodiment of the disclosure. In FIG. 5, at least a portion of reflected infrared light 409B received from ellipsoidal combiner 431 is reflected by beam splitter 425. Lens assembly 535 includes a first lens 536, a second lens 537, and a third lens 538. In FIG. 5, lens 536 is a bi-convex lens, lens 537 is a meniscus lens, and lens 538 is a meniscus lens. Of course, other lenses may be utilized to focus reflected infrared light 409C onto light sensor 445, depending on the mechanical configuration of the system. Lens 537 is disposed between lens 536 and 538. In the illustrated embodiment, reflected infrared light 409C encounters lens 536, 537, and 538, in that order. Lens assembly 535 focuses reflected infrared light 409C onto light sensor 445.

Figure 6:
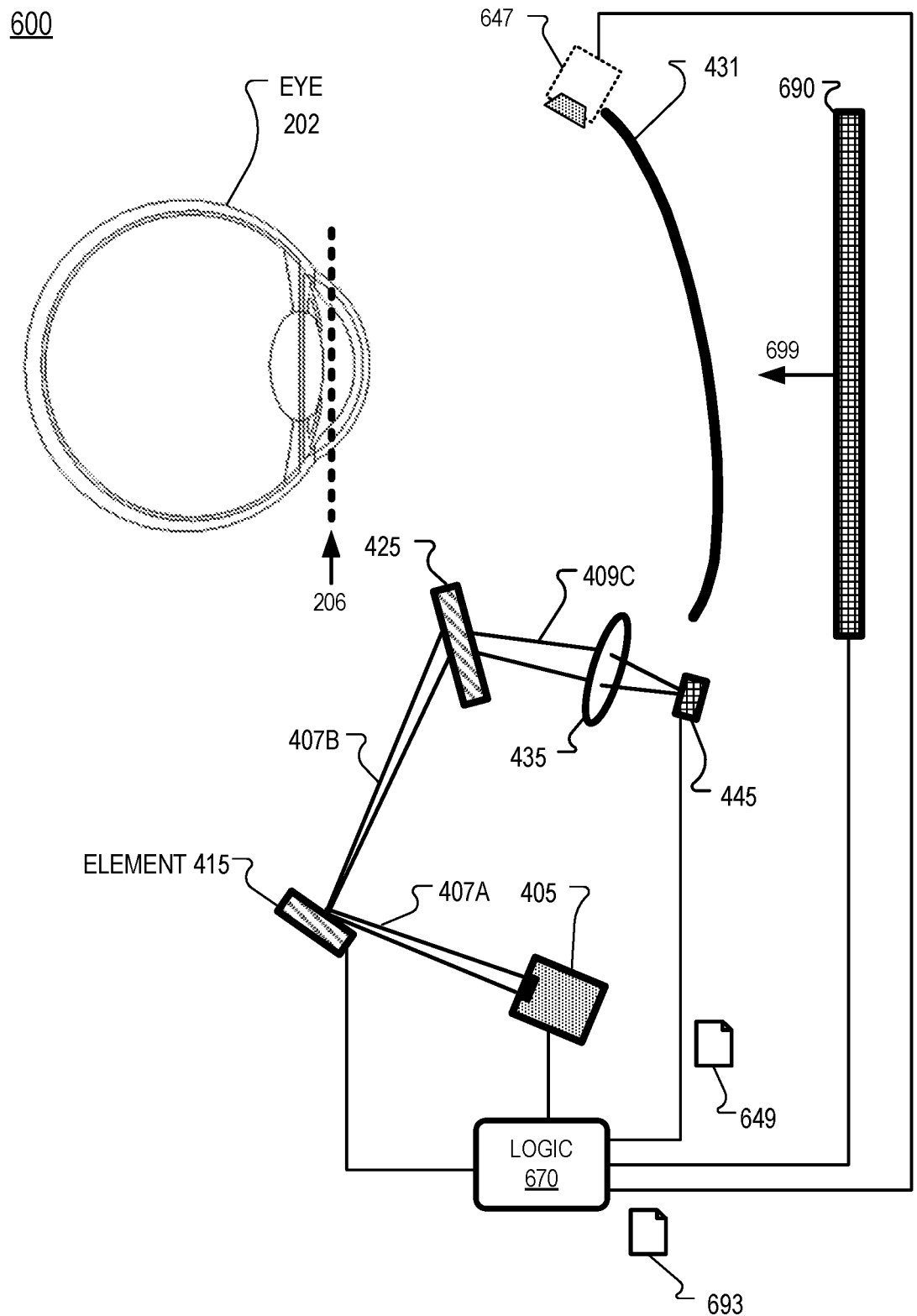
FIG. 6 illustrates a retinal imaging system that may be utilized in an HMD, in accordance with an embodiment of the disclosure.

FIG. 6 illustrates a retinal imaging system 600 that may be utilized in an HMD, in accordance with an embodiment of the disclosure. Retinal imaging system 600 includes an eye-tracking module 647 for determining a position of eye 202. In some embodiments, eye-tracking module 647 includes a camera configured to capture infrared images of eye 202. Eye-tracking module 647 may be configured similarly to eye-tracking module 147. Eye-tracking module 647 generates eye-tracking data 693 that may include a position of eye 202. For example, eye 202 may change gaze angles in any combination of up, down, right, and left, and eye-tracking module 647 may provide those gaze angles in eye-tracking data 693 by analyzing images of eye 202. Display 690 generates visible image light 699 for presenting a virtual image to a user of an HMD. Visible image light 699 may propagate through ellipsoidal combiner 431 with very little (if any) optical loss since ellipsoidal combiner 431 is configured to pass visible light and reflect a particular bandwidth of infrared light emitted by light source 405. Display 690 may include an OLED, micro-LED, or LCD in a virtual reality context. In an augmented reality or mixed reality context, display 690 may include a transparent OLED or an LCOS projector paired with a waveguide included in a lens of an HMD, for example.

In FIG. 6, processing logic 670 is configured to control display 690 and drive images onto display 690. Processing logic 670 is also configured to receive eye-tracking data 693 generated by eye-tracking module 647. Optionally, processing logic 670 is configured to control the intensity of infrared illumination light 407 emitted by light source 405. Processing logic 670 is further configured to select a scanning position of beam-steering element 415 and configured to initiate a light capture of light sensor 445 corresponding to the scanning position of the beam-steering element that is selected. This allows processing logic 670 to associate the light measurements 649 captured with light sensor 445 with a particular position on ellipsoidal combiner 431 and corresponding "pixel" of retina 208. Processing logic 670 may coordinate generating a retinal image by raster-scanning through different selected scanning positions of beam-steering element 415 and recording the corresponding light measurements 649 from light sensor 445. Although the optical paths associated with infrared illumination light 407C and reflected infrared light 409A/B are not illustrated in FIG. 6, they may follow the optical paths illustrated in FIGS. 4A-4C.

Figure 7:
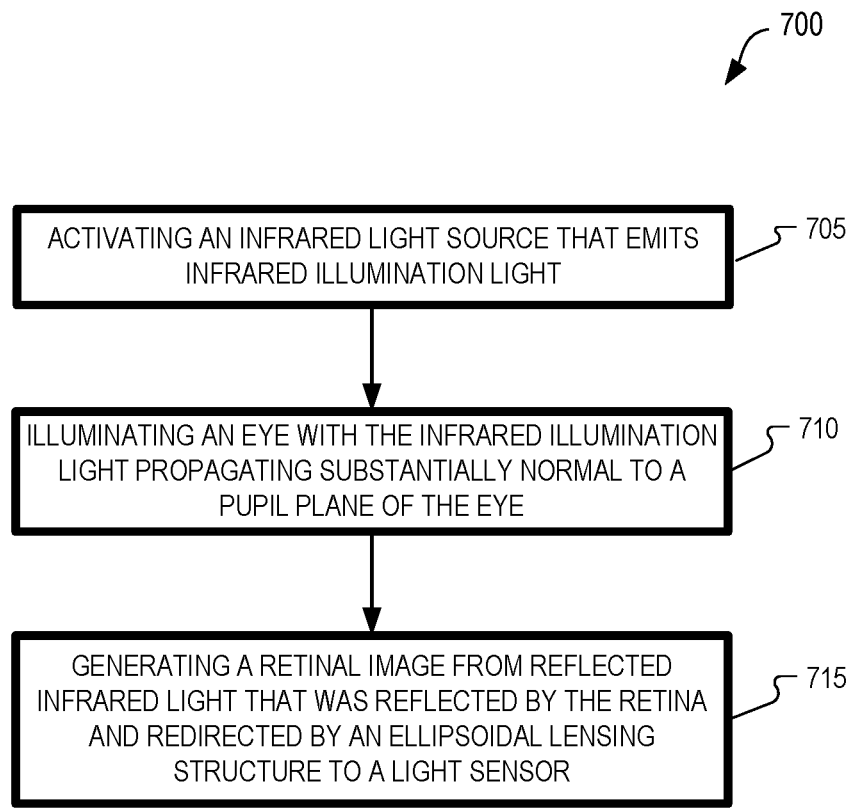
FIG. 7 illustrates a flow chart for a process of generating a retinal image with an ellipsoidal lensing structure, in accordance with an embodiment of the disclosure.

FIG. 7 illustrates a flow chart for a process 700 of generating a retinal image with an ellipsoidal lensing structure, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. In some embodiments, all or a portion of the process blocks associated with process 700 are executed by processing logic 670 of FIG. 6.

In process block 705, an infrared light source is activated that emits infrared illumination light (e.g. infrared illumination light 407A). The infrared light source may be an LED or a laser diode. The infrared illumination light may be centered around 850 nm, for example. Processing logic 670 may activate the infrared light source (e.g. light source 405) in some embodiments.

In process block 710, an eye is illuminated by the infrared illumination light that propagates substantially normal to a pupil plane (e.g. 206) of the eye. Illuminating the eye includes illuminating an ellipsoidal lensing structure (e.g. ellipsoidal lensing structure 331, 343, or 351). The infrared illumination light illuminating the ellipsoidal lensing structure may be collimated or near-collimated In process block 715, a retinal image is generated from reflected infrared light (e.g. reflected infrared light 409). The reflected infrared light is the infrared illumination light (e.g. 407) reflected by the retina of the eye and exiting a pupil of the eye. The ellipsoidal lensing structure redirects the reflected infrared light to a light sensor (e.g. 445) that facilitates generating the retinal image. The light sensor may receive the reflected infrared light through at least one lens. The ellipsoidal lensing structure may be included in a near-eye combiner of a head mounted display (HMD) that is substantially transparent to visible light.

In some embodiments of process 700, illuminating the eye includes scanning a beam-steering element (e.g. 415) to a selected scan position where the beam-steering element directs the infrared illumination light to the ellipsoidal lensing structure. In some embodiments, the scan position is selected in response to received eye-tracking data (e.g. 693) that includes a position of the eye.

In an embodiment of process 700, illuminating the eye includes scanning a beam-steering element to a plurality of two-dimensional scan positions. This may facilitate a pixel-by-pixel approach to capturing the retinal image when the scan rate is fast enough to raster scan through the plurality of two-dimensional scan positions in less than 50 ms, for example. The two-dimensional scan positions may be associated with particular physical locations on the ellipsoidal lensing structure.

Process 700 may further include identifying a fovea region from the retinal image that is generated and then determining a gaze angle of the eye based on the fovea region. The fovea region of the retina may be determined using known image processing techniques. When the gaze angle is determined, a virtual image presented to a user by a display (e.g. display 690) of an HMD may be adjusted in response to the determined gaze angle. In the context of system 600, processing logic 670 may generate the retinal image based on light measurements 649 that correspond with different "pixel" locations of the retina. Processing logic 670 may then perform image processing techniques to determine the fovea region and the corresponding gaze angle from the location of the fovea within the retinal image. Processing logic 670 may then adjust a virtual image that is driven on to display 690 based at least in part on the determined gaze angle. Adjusting the virtual image may include applying blurring filters to provide focusing cues for the user or moving virtual objects in the virtual image, for example.

In process 700, the ellipsoidal lensing structure may be configured to have a first foci at a center of rotation of the eye. Illuminating the ellipsoidal lensing structure may include directing, from a second foci (e.g. 442) of the ellipsoidal lensing structure, the infrared illumination light to the ellipsoidal lensing structure. In some embodiments, the infrared illumination light propagates through a beam splitter (e.g. 425) prior to encountering the ellipsoidal lensing structure and the reflected infrared light is directed to the light sensor by the beam splitter.

Figure 8:
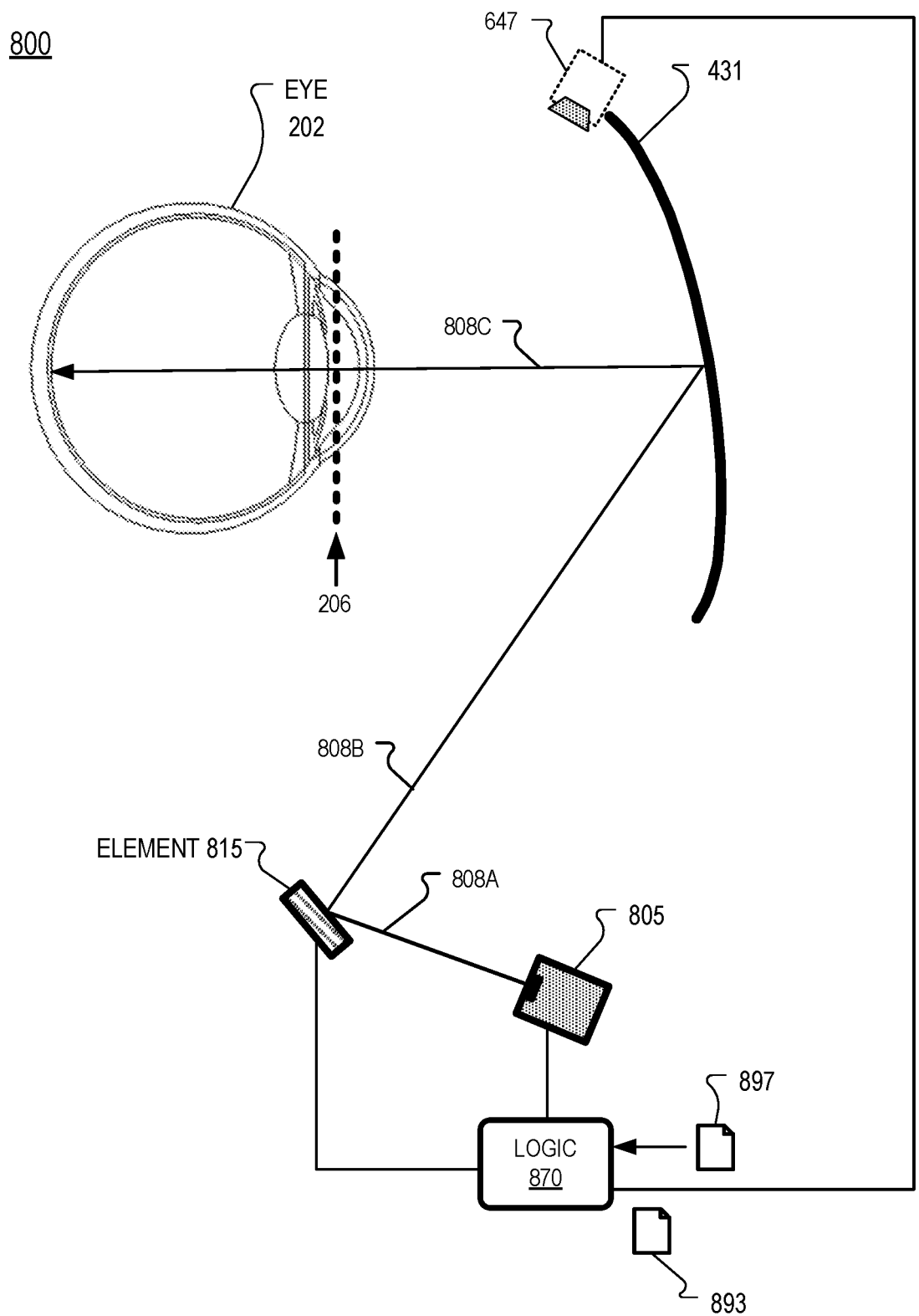
FIG. 8 illustrates a near-eye display including a light source and a beam-steering element, in accordance with an embodiment of the disclosure.

FIG. 8 illustrates a near-eye display 800 including a light source 805 and a beam-steering element 815, in accordance with an embodiment of the disclosure. Near-eye display 800 may be incorporated into an HMD to present virtual images to a user of the HMD. The ellipsoidal combiner 431 may be configured to be positioned near eye 202 where the first foci of the ellipsoidal structure is at a center of rotation of the eye 202. In FIG. 8, light source 805 is a visible light source rather than an infrared light source. Light source 805 may include a plurality of light emitters emitting different wavelengths of light. In one example, light source 805 includes a red laser diode, a green laser diode, and blue laser diode. In another example, light source 805 includes a red LED, green LED, and blue LED.

In operation, processing logic 870 receives image data 897 to be presented as a virtual image to a user with near-eye display 800. Processing logic 870 may drive beam-steering element 815 to a different x-y coordinate position for each pixel included in image data 897. Beam-steering element 815 may be located at a second foci of ellipsoidal combiner 431. Beam-steering element 815 may be a digital micromirror device (DMD). While beam-steering element 815 is at a particular x-y coordinate, processing logic 870 may selectively activate the different light emitters in light source 805 to generate the correct color for each pixel. Processing logic 870 may be configured to control the time and/or intensity of the light emitters in light source 805 to generate the color of a pixel included in image data 897. Beam-steering element 815 directs the display light 808A emitted by the light emitters to ellipsoidal combiner 431 as display light 808B. Display light 808B may be collimated light. Ellipsoidal combiner 431 is configured to redirect the display light 808B through the pupil of eye 202 as display light 808C. By raster-scanning the display light to different two-dimensional coordinates on ellipsoidal combiner 431, near-eye display 800 forms a virtual image that is presented to eye 202 via ellipsoidal combiner 431.

The two-dimensional coordinates on ellipsoidal combiner 431 that the beam-steering element is driven to direct display light 808B to is dependent on the position of eye 202 since the virtual image must be presented where the display light 808C can enter the pupil. For example, if eye 202 was rotated to the top of the page, directing the display light 808B to the middle of the ellipsoidal combiner would not direct the display light 808C through the pupil. Rather, the two-dimensional coordinates to direct each pixel of the image data 897 would change so that the display light 808C would propagate through the pupil and become incident on the retina. Hence, processing logic 870 may be configured to drive the beam-steering element 815 to different two-dimensional coordinates corresponding with an eye-position provided in eye-tracking data 893 received from eye-tracking module 647.

Figure 9:
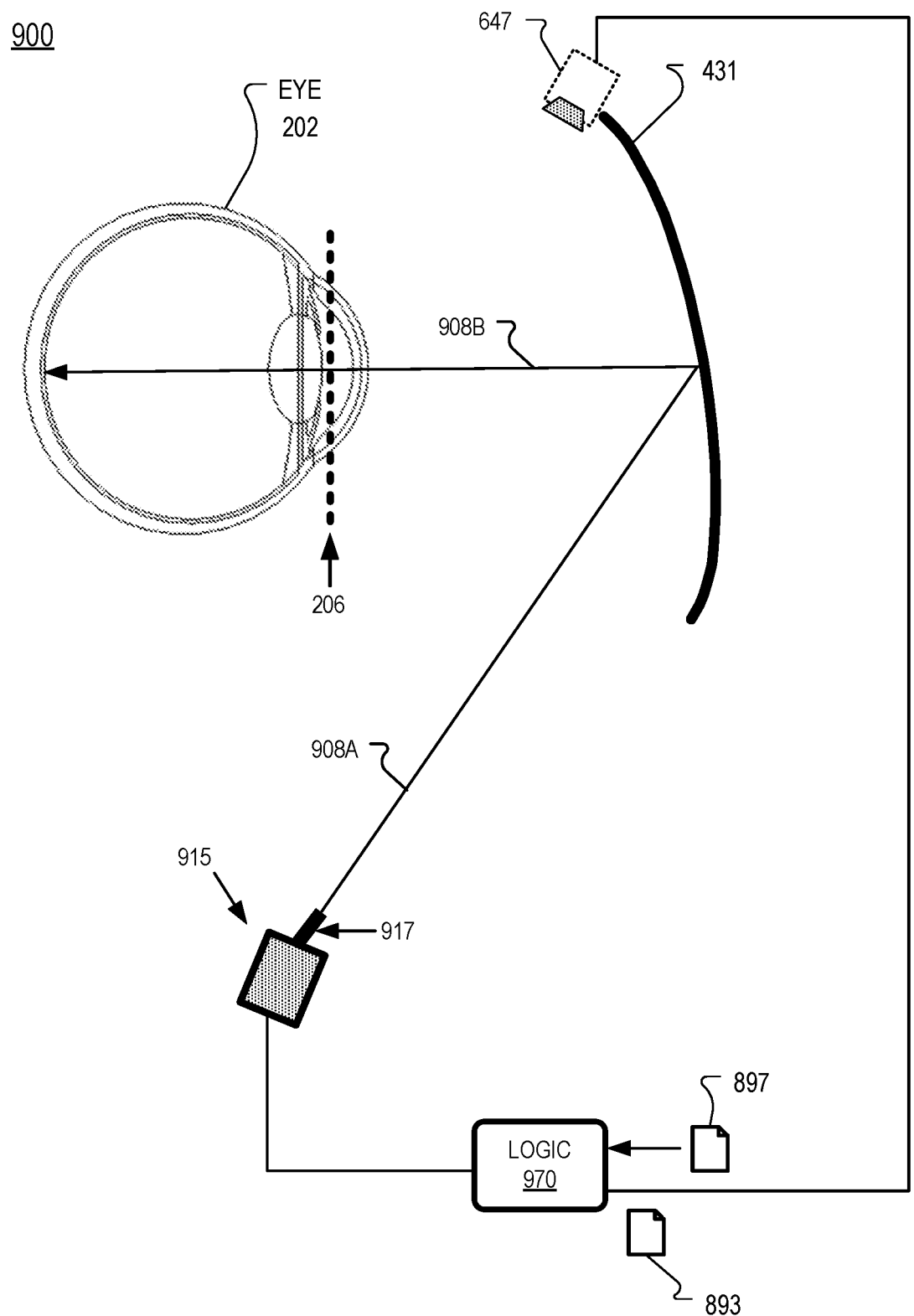
FIG. 9 illustrates a near-eye display that includes a scanning fiber module, in accordance with an embodiment of the disclosure.

FIG. 9 illustrates a near-eye display 900 that includes a scanning fiber module 915, in accordance with an embodiment of the disclosure. Instead of using a mirrored element as in display 800, display 900 uses a scanning fiber module 915 that includes a fiber 917 that is configured to change positions to direct display light 908A to different two-dimensional coordinates on ellipsoidal combiner 431. Scanning fiber module 915 and beam-steering element 815 may both be considered "scanners" in that they direct the display light to different coordinates. In FIG. 9, processing logic 970 is configured to receive image data 897 and configured to drive scanning fiber module 915 to direct display light 908B to different coordinates to form an image on the retina. Logic 970 may also be configured to receive eye-tracking data 893 from eye-tracking module 647 and drive the scanning fiber module 915 to different two-dimensional coordinates corresponding with an eye-position provided in eye-tracking data 893 received from eye-tracking module 647.

The scanning fiber module 915 may include a one or more piezo-electric actuators that are coupled to move the fiber 917. The fiber 917 of the scanning fiber module may be moved at a high rate to illuminate different locations of the ellipsoidal combiner 431. The display light 908A emitted by the scanning fiber module 915 may be collimated or near-collimated. In some embodiments, scanning fiber module 915 may include a plurality of light emitters emitting different wavelengths of light that are selectively coupled into fiber 917 for output of the light. The light emitters may include a red laser diode, a green laser diode, and blue laser diode. In another example, the light emitters include a red LED, a green LED, and blue LED. Processing logic 970 may be configured to control the time and/or intensity of the light emitters in to generate the color of a pixel included in image data 897.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 670, 870 or 970) in this disclosure may include one or more processors, microprocessors, multi-core processors, Application-specific integrated circuits (ASIC), graphics processing units (GPUs), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
   activating an infrared light source that emits infrared illumination light;
   illuminating an eye with the infrared illumination light propagating substantially normal to a pupil plane of the eye, wherein illuminating the eye includes illuminating an ellipsoidal lensing structure, wherein the ellipsoidal lensing structure is configured to have a first foci that is positioned at a center of rotation of the eye, wherein the ellipsoidal lensing structure is an ellipsoidal combiner configured to pass visible light to the eye and to redirect the infrared illumination light to the eye; and
   generating a retinal image from reflected infrared light, wherein the reflected infrared light is the infrared illumination light reflected by a retina of the eye and exiting a pupil of the eye, and wherein the ellipsoidal lensing structure redirects the reflected infrared light to a light sensor that facilitates generating the retinal image.

2. The method of claim 1, wherein illuminating the eye includes scanning a beam-steering element to a selected scan position, wherein the beam-steering element directs the infrared illumination light to the ellipsoidal lensing structure.

3. The method of claim 2, further comprising:
   receiving eye-tracking data that includes a position of the eye, wherein the scan position is selected in response to the eye-tracking data.

4. The method of claim 1, wherein illuminating the eye includes scanning a beam-steering element to a plurality of two-dimensional scan positions, and wherein generating the retinal image includes capturing a plurality of light measurements from the light sensor while the beam-steering element is in the corresponding plurality of two-dimensional scan positions.

5. The method of claim 1 further comprising:
   identifying a fovea region from the retinal image; and
   determining a gaze angle of the eye based on a position of the fovea region.

6. The method of claim 5 further comprising:
   adjusting a virtual image presented to a user of a head mounted display (HMD) in response to the determined gaze angle, wherein visible image light of the virtual image propagates from a first surface of the ellipsoidal lensing structure to a second surface of the ellipsoidal lensing structure through the ellipsoidal lensing structure to the eye.

7. The method of claim 1, wherein illuminating the ellipsoidal lensing structure includes directing, from a second foci of the ellipsoidal lensing structure, the infrared illumination light to the ellipsoidal lensing structure.

8. The method of claim 1, wherein the light sensor receives the reflected infrared light through at least one lens.

9. The method of claim 1, wherein the ellipsoidal lensing structure is included in a near-eye combiner of a head mounted display (HMD) that is substantially transparent to visible light.

10. The method of claim 1, wherein the infrared illumination light illuminating the ellipsoidal lensing structure is collimated or near-collimated.

11. The method of claim 1, wherein the infrared illumination light propagates through a beam splitter prior to encountering the ellipsoidal lensing structure, and wherein the reflected infrared light is directed to the light sensor by the beam splitter.

12. A near-eye optical system for imaging a retina, the near-eye optical system comprising:
   an infrared light source configured to emit infrared illumination light;
   an ellipsoidal combiner configured to redirect the infrared illumination light to an eyebox location and to pass visible light to the eyebox, the ellipsoidal combiner including an ellipsoidal lensing structure having a first foci and a second foci, wherein the ellipsoidal combiner is configured to be positioned relative to the eyebox location where the first foci of the ellipsoidal lensing structure is positioned approximately at a center of rotation of an eye placed in the eyebox location;
   a light sensor configured to receive reflected infrared light reflected by a retina and exiting a pupil of an eye placed in the eyebox location, wherein the ellipsoidal lensing structure is configured to redirect the reflected infrared light to the light sensor; and
   a beam-steering element configured to selectively redirect the infrared illumination light to the ellipsoidal combiner and configured to redirect the reflected infrared light to the light sensor.

13. The near-eye optical system of claim 12 further comprising:
   a beam splitter, wherein the infrared illumination light encounters the beam splitter before encountering the ellipsoidal combiner, and wherein the reflected infrared light encounters the beam splitter before becoming incident on the light sensor.

14. The near-eye optical system of claim 13, further comprising:
   at least one focusing lens disposed between the light sensor and the beam splitter.

15. The near-eye optical system of claim 12 further comprising:
   processing logic configured to select a scanning position of the beam-steering element, wherein the processing logic is configured to initiate a light capture of the light sensor corresponding to the scanning position selected.

16. The near-eye optical system of claim 12, wherein the light sensor includes at least one of a photodiode or a photomultiplier tube, and wherein the beam-steering element includes a scanning fiber or a digital micromirror device (DMD).

17. A near-eye display comprising:

a light source configured to emit display light;

an ellipsoidal combiner configured to redirect the display light to an eyebox location and configured to reflect infrared light to the eyebox location, the ellipsoidal combiner including an ellipsoidal lensing structure having a first foci and a second foci, wherein the ellipsoidal combiner is configured to be positioned relative to an eyebox location where the first foci of the ellipsoidal lensing structure is positioned approximately at a center of rotation of an eye placed in the eyebox location;

a scanner configured to raster scan the display light to two-dimensional coordinates on the ellipsoidal combiner to present an image to the eye placed in the eyebox location; and processing logic configured to receive eye-tracking data from an eye-tracking module and configured to drive the scanner to raster scan the display light to the two-dimensional coordinates corresponding with an eye-position included in the eye-tracking data, wherein the eye-tracking data is at least partially based on the infrared light.

18. The near-eye display of claim 17, wherein the scanner includes a scanning fiber or a digital micromirror device (DMD).

19. The near-eye display of claim 17, wherein the processing logic is configured to modulate an intensity of the light source for a given coordinate of the two-dimensional coordinates to form the image.

* * * * *